Patented Apr. 16, 1929.

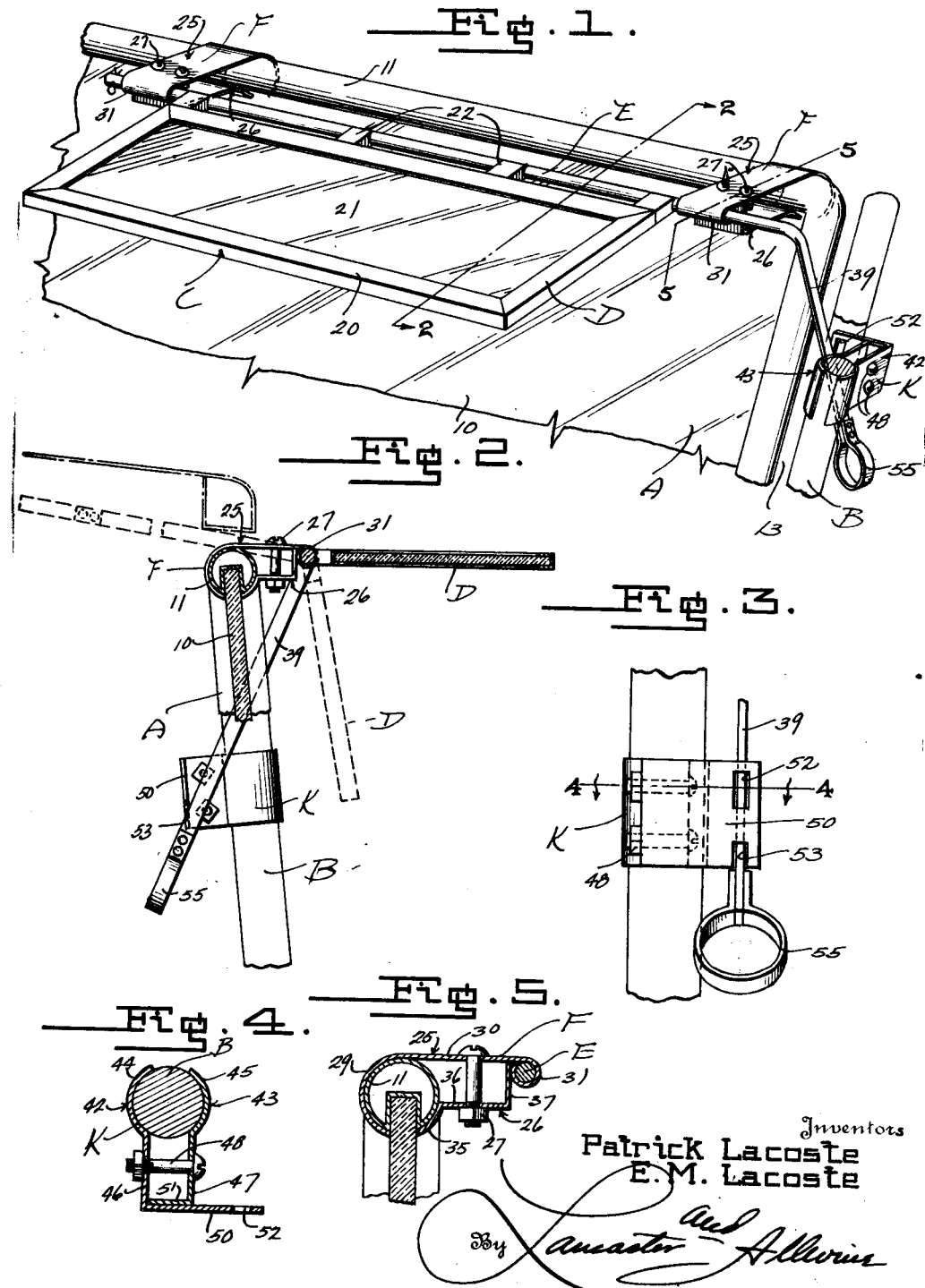

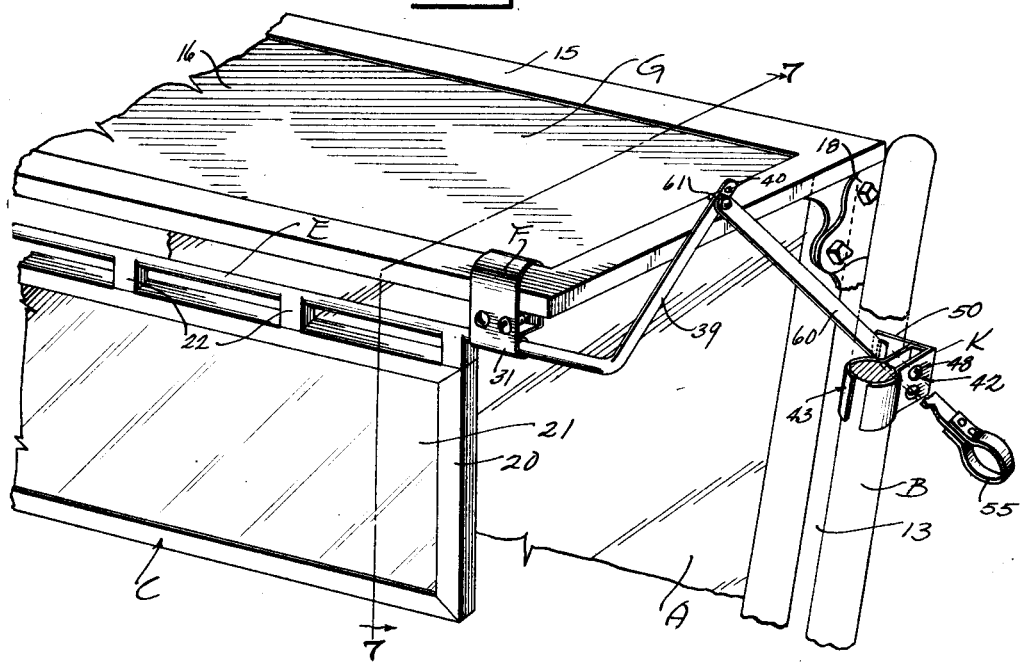
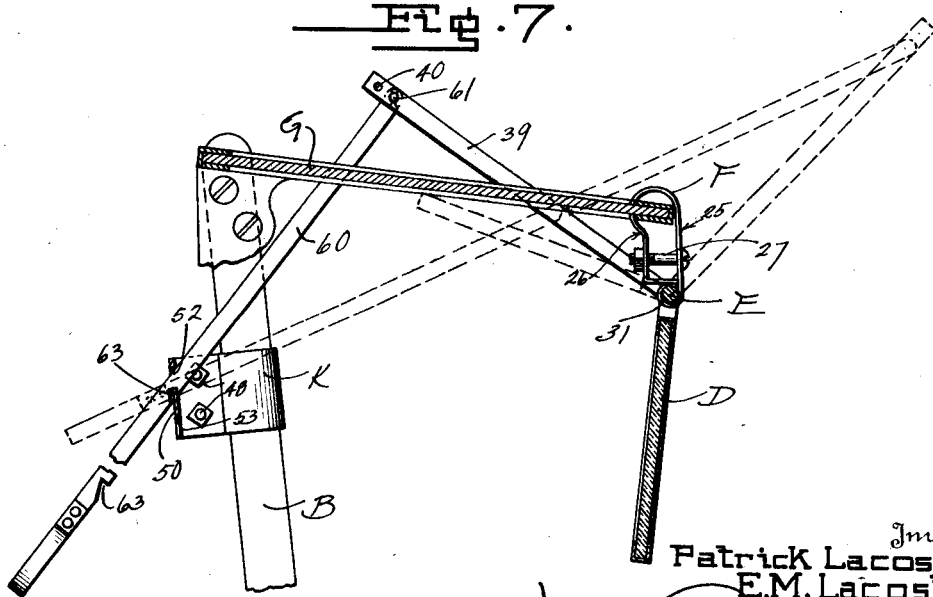

1,709,437

UNITED STATES PATENT OFFICE.

PATRICK LACOSTE AND EDNA M. LACOSTE, OF SAN ANTONIO, TEXAS.

ANTIGLARE SHIELD.

Application filed March 14, 1924. Serial No. 699,264.

This invention relates to improvements in shield apparatus for the windshields of vehicles, whereby to prevent glare of bright lights in the eyes of the driver of the vehicle.

The primary object of this invention is the provision of an auxiliary shield which is preferably formed of some translucent material adapted to be adjustably connected to the ordinary windshield of a vehicle to serve either as a sun visor or dimmer shield to counteract the bright lights of approaching traffic.

A further and important object of this invention is the provision of a novel antiglare shield which may be connected in interchangeable manner directly with the conventional windshield of a vehicle or with the sun visor which may be attached thereto.

A further and important object of this invention is the provision of a novel type of dimmer shield for preventing glare of bright lights, and novel means for operating the same so that it may be held in the desired position.

Other objects and advantages of this invention will be apparent during the course of the following detailed description.

In the accompanying drawings, forming a part of this specification, and wherein similar reference characters designate corresponding parts throughout the several views.

Figure 1 is a fragmentary perspective view of a vehicle windshield, showing the improved anti-glare shield construction as carried thereby in an elevated position with respect thereto, and acting in the nature of a sun visor.

Fig. 2 is a cross sectional view taken through the vehicle windshield and the improved anti-glare shield construction, showing the anti-glare shield elevated in full lines, and in dotted lines showing the position which the anti-glare shield may assume with respect to the windshield when it is desired to dim rays of the bright lights of approaching traffic.

Fig. 3 is a fragmentary elevation showing novel means by which the anti-glare shield may be supported in a desired position.

Fig. 4 is a cross sectional view taken substantially on the line 4—4 of Figure 3.

Fig. 5 is a cross sectional view taken substantially on the line 5—5 of Figure 1.

Fig. 6 is a fragmentary perspective view showing the manner in which the improved anti-glare shield construction may be connected to a conventional visor shield in an operating relation with respect to the conventional windshield.

Fig. 7 is a cross sectional view taken substantially on the line 7—7 of Figure 6.

In the drawings, wherein for the purpose of illustration is shown the improved antiglare shield and the various ways in which it may be used, the letter A may generally designate the conventional windshield of an automobile, which is ordinarily supported in pivoted and slightly spaced relation between posts B which are rigid with the vehicle to which the windshield is attached. The improved anti-glare shield construction C preferably includes the shield member D; pivot member E; clamps F for supporting the member either upon the windshield A or a sun visor G; and a lock clamp K which may be used to support the anti-glare shield D in a desired position with respect to the windshield A.

The conventional windshield A, of course, includes the transparent pane 10, embedded in the channel framing 11. In ordinary windshield construction the windshield A is mounted with respect to the stationary posts B, so that a space 13 is provided between the sides of the windshield frame 11 and the posts B.

As is illustrated in Figure 1 of the drawings the improved anti-glare shield construction C may be mounted directly upon the windshield A, or as illustrated in Figure 6 the improved windshield construction C may be used in connection with the sun visor G. This sun visor G includes framing 15 which receives a translucent pane 16; the visor G being ordinarily upwardly mounted upon the ordinary windshield A as by means of brackets 18; the normal position of the visor G being substantially horizontal, and at right angles to the windshield A, although some sun visors are adjustable with respect to the windshield A.

The dimmer shield D preferably includes the channel framing 20, which may be of rectangular formation, and which supports therein the translucent pane 21, of any desired color adapted to best dim bright lights, such as sun light and the headlights of approaching vehicles. The upper portion of the frame 20 is preferably welded, as at 22, to the supporting rod E; the latter preferably being round and adapted to oscillatively bear in clamps F by means of which the shield B may be supported upon the windshield A or the sun visor G.

The clamps F are of novel construction, and as is well illustrated in Figure 5 of the drawings include a major clamp section 25; the minor clamp section 26; and the bolts 27 by means of which the sections 25 and 26 are clamped together upon the channel portion of the windshield A or sun visor G. The section 25 of the clamp construction includes the arcuate or otherwise formed jaw portion 29; the flat portion 30; and the barrel portion 31 adapted to oscillatively receive therein the supporting rod E. The section 26 includes the preferably arcuate jaw portion 35; the flat attaching portion 36; and the portion 37 right angled with respect to the portion 36 and adapted to engage the section 25 of the clamp F just behind the pintle barrel 31. The bolts 27 extend through the portions 30 and 36 of the sections 25 and 26 respectively, for the purpose of clamping said sections together so that the arcuate jaw portions 29 and 35 may grip the channel framing of either the windshield A or the sun visor G.

The supporting rod E, as above mentioned, is fixedly connected, as by welding, with the anti-glare shield D; and the ends of this rod extend outwardly beyond the ends of the shield D and are supported by a pair of the bearing clamps F. At one end the rod E is provided with a right angled lever portion 39 which at the free end thereof is provided with a pair of spaced openings 40.

As is illustrated in Figure 1 of the drawings, the anti-glare shield D may be connected directly with the windshield A upon the upper portion of the channel framing 11 thereof. With this construction the lever arm 39 of the rod E extends through the space 13 between the side frame of the shield A and its post B. The locking clamp K is supported by the posts B so that the lever arm 39 may cooperate therewith in supporting the shield D in a substantially horizontal position to act as a sun visor; or the arm 39 in this arrangement of the shield D may be disconnected from the clamp K for the purpose of permitting the shield D to lower in substantial parallelism with the windshield A for the purpose of acting as a dimmer for the bright lights of approaching vehicles.

The clamp K adapted to cooperate in supporting the anti-glare shield D in a desired position preferably includes the sections 42 and 43 which respectively include jaw portions 44 and 45, and the attaching flat portions 46 and 47 respectively adapted to be connected by means of a bolt or bolts 48. The section 42 includes the lever connecting flange 50 disposed at right angles to the portion 46 of this section; and the section 45 is similarly provided with a right angle flange 51 adapted to abut against the flange 50 forwardly thereof. The bolts 48 draw the sections together so that the flange 51 engages the portion 46 of the section 42 and draws the jaw portions 44 and 45 of the clamp sections into engagement about the post B, substantially as is illustrated in Figure 4 of the drawings. In this relation of parts the flange 50 extends laterally of the post B and across the space 13; it being provided with an opening 52 therein and a lower slot 53.

If the anti-glare shield D is assembled directly upon the windshield A the lever arm 39 preferably has a looped handle 55 riveted to the openings 40 in the lever arm 39; and the lever arm 39 in order to support the anti-glare shield D in substantially horizontal position is engaged in the notch 53 of the lock clamp K. To release the lever arm 39 from this slot or notch 53 it is merely necessary to slightly lower the lever arm 39 and by moving the same laterally it may be free of the flange 50 for the purpose of permitting the lever arm 39 to ride upwardly in the slot 13 and to permit lowering of the anti-glare shield D into the dimming position illustrated in dotted lines in Figure 2 of the drawings.

As is illustrated in Figure 6 of the drawings, the anti-glare shield construction C may be mounted forwardly upon the sun visor G, and this mounting by means of the clamps F is exactly the same as above described for the mounting of the anti-glare shield upon the windshield A. The handle 55, however, is not used upon the lever arm 39, but an operating rod 60 is employed which is pivotally connected as by means of a pin 61 in one of the openings 40 of the lever arm 39. This operating rod 60 thus extends rearwardly through the space 13 between the windshield A and its post B and extends through the opening 52 in the clamp flange 50; the operating rod 60 preferably having the handle 55 above mentioned affixed to the rear end of the same. The operating rod 60 is preferably provided with a series of notches 63 therein which may engage over a portion of the flange 50 for the purpose of holding the dimmer shield D in an elevated or lowered adjustment with respect to the windshield A and visor G, and as is illustrated in full and dotted lines in Figure 7 of the drawings.

From the foregoing description of this invention it is apparent that a novel type of anti-glare shield has been provided which may function equally well as a sun visor or as a dimmer shield for filtering the bright rays of light from the head lamps of approaching vehicles. The improved anti-glare construction C is interchangeable either with the ordinary windshield construction or as the sun visor construction which is sometimes employed, and the parts are of a practical nature to provide a compact structure which may support the antiglare shield in a stable and proper position.

Various changes in the shape, size, and arrangement of parts may be made to the form of invention herein shown and described, without departing from the spirit of this invention, or the scope of the following claim.

We claim:

In an anti-glare shield construction for direct attachment to a windshield or a windshield sun visor the combination of an antiglare shield having a supporting rod rigid therewith which extends at its ends beyond the side edges of the glare shield, detachable clips on said ends of the rod forming bearings for oscillation of the rod, said clips being adapted for attachment either to a windshield or a windshield sun visor, a right angled rigid arm extending from one end of the rod being apertured at its free end, an operating arm, detachable means for pivoting the operating arm at one end in an aperture at the free end of the first mentioned arm, and a windshield post attaching clip having a plurality of openings therethrough, one of which is adapted to receive the first mentioned arm when the glare shield is applied direct to a windshield and the second mentioned arm is removed, and the other of which openings is adapted to slidably receive the second mentioned arm for operating engagement therein when the glare shield is used upon a sun visor or the like, said second mentioned arm at its free end having openings therein corresponding in size and arrangement to the apertures in the free end of the first mentioned arm, and a handle for detachable connection with the apertures in the free end of the first mentioned arm or with the openings in the free end of the second mentioned arm in event the second mentioned arm is not connected therewith.

PATRICK LACOSTE.
EDNA M. LACOSTE.